June 23, 1970     K. DULLINGER     3,516,297

DRIVE FOR LABELING DEVICE

Filed Oct. 23, 1968     2 Sheets-Sheet 1

INVENTOR
KARL DULLINGER

BY Wheeler, Wheeler, Houser & Clemency
ATTORNEYS

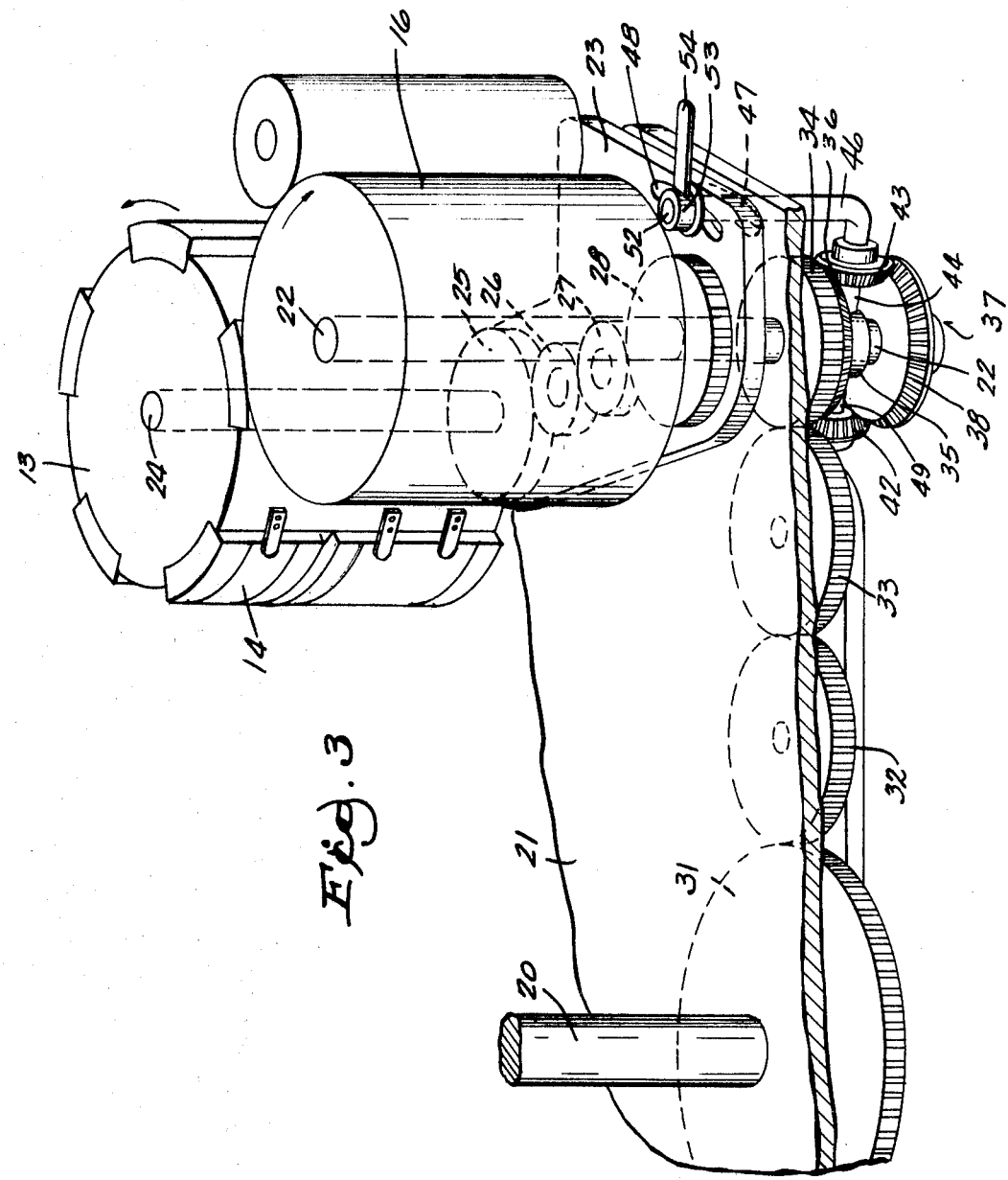

United States Patent Office 3,516,297
Patented June 23, 1970

3,516,297
DRIVE FOR LABELING DEVICE
Karl Dullinger, Neutraubling, Germany, assignor to
Hermann Kronseder, Neutraubling, Germany
Filed Oct. 23, 1968, Ser. No. 769,851
Claims priority, application Germany, Dec. 2, 1967,
1,586,373
Int. Cl. B65c 9/06; F16h 35/06
U.S. Cl. 74—395                                     6 Claims

ABSTRACT OF THE DISCLOSURE

A container labeling machine adapted to selectively label series of containers of different sizes. A rotary labeling turret adjacent the container turntable conveyor is powered through a power drive train from the conveyor to turn in timed relation to the advance of the containers thereon. The turret is swung toward and away from the conveyor to accommodate a particular size of container thereon. Because of the interaction of the gears in the power train, such swinging movement is accompanied by a slight rotation of the labeling turret which, in turn, results in misregistration or mistiming of the turret with respect to the containers on the conveyor. The disclosure provides mechanism to rotate the turret on its own axis independently of the drive train to selectively advance and retard the timed relation between the conveyor and the turret, and thus restore proper timing and registration of the turret with the containers, regardles of container size.

BACKGROUND OF THE INVENTION

In container labeling machines to which the invention relates, it is important for proper transfer of labels from the labeling turret to the containers that the center of the curved label transfer pads be as nearly as possible aligned with the radius line drawn through the center of rotation of the turntable and the center of the container. This alignment is disturbed when the labeling turret is swung on a support axis eccentric to its own axis toward or away from the turntable. This is because the interaction of the gears in the power train between the turntable conveyor and the labeling turret will rotate the turret about its own axis, one way or the other, as a consequence of its swinging movement, thus altering the timed relation between the containers and the turret and misregistering the turret label pads with respect to the containers.

SUMMARY OF THE INVENTION

In accordance with the present invention, mechanism is provided to rotate the turret on its own axis independently of the drive train, thus to selectively advance and retard the timed relation between the conveyor and the turret and thus restore the transfer pads to a registering position with respect to the conainers, regardless of their sizes. In the preferred embodiment, this mechanism comprises a differential in the gear train from the turntable to the turret so that the gears can be advanced or retarded without disconnecting or breaking the gear train. In the exemplary embodiment, the pinion gears on the differential have an axle with an extending handle by which the pinions can be rotated or orbited through an arc appropriate for correcting the timing.

Other objects, features, and advantages of the invention will appear from the following disclosure.

DESCRIPTION OF THE DRAWINGS

FIG. 3 is a diagrammatic perspective view of certain parts of the invention, including the gear train and differential.

DESCRIPTION OF THE PREFERRED EMBODIMENT

Figure 1:
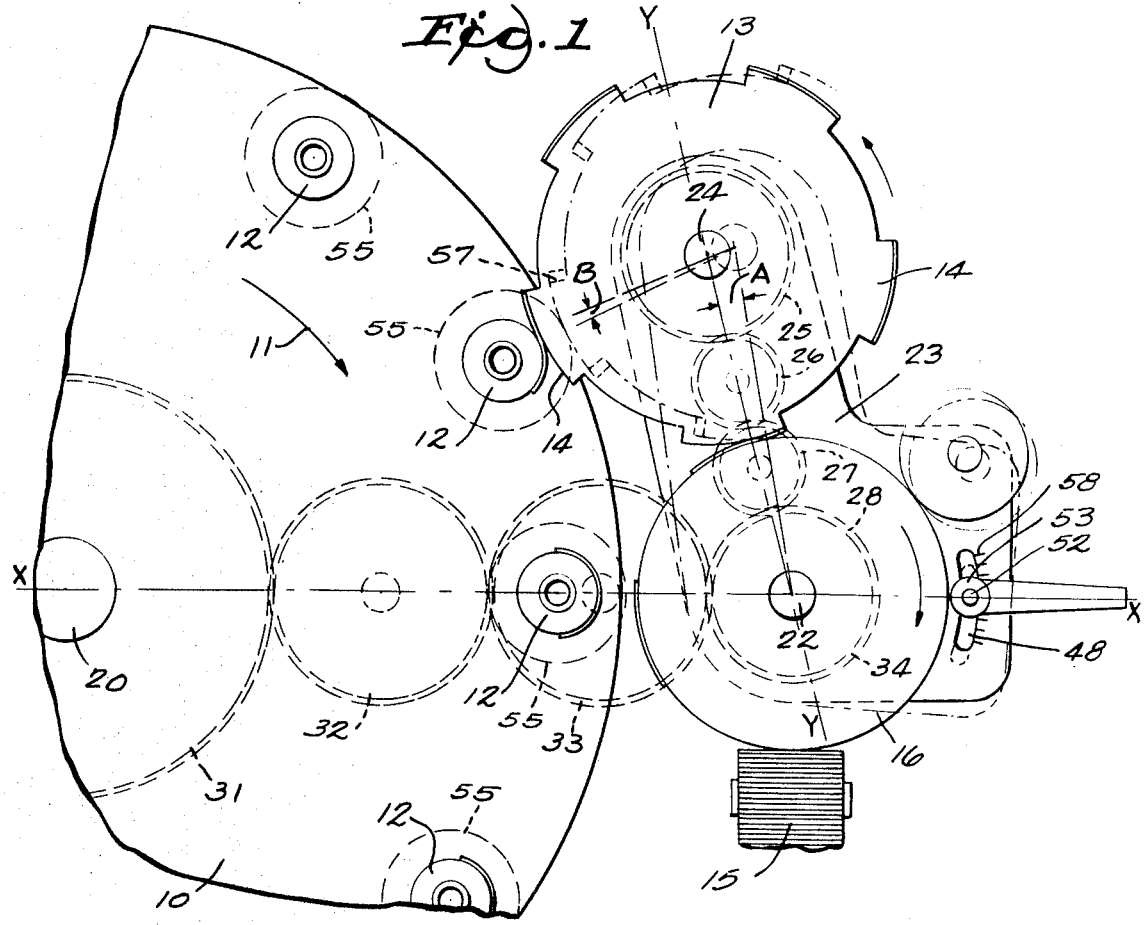
FIG. 1 is a fragmentary plan view of a machine embodying the invention.
Figure 2:
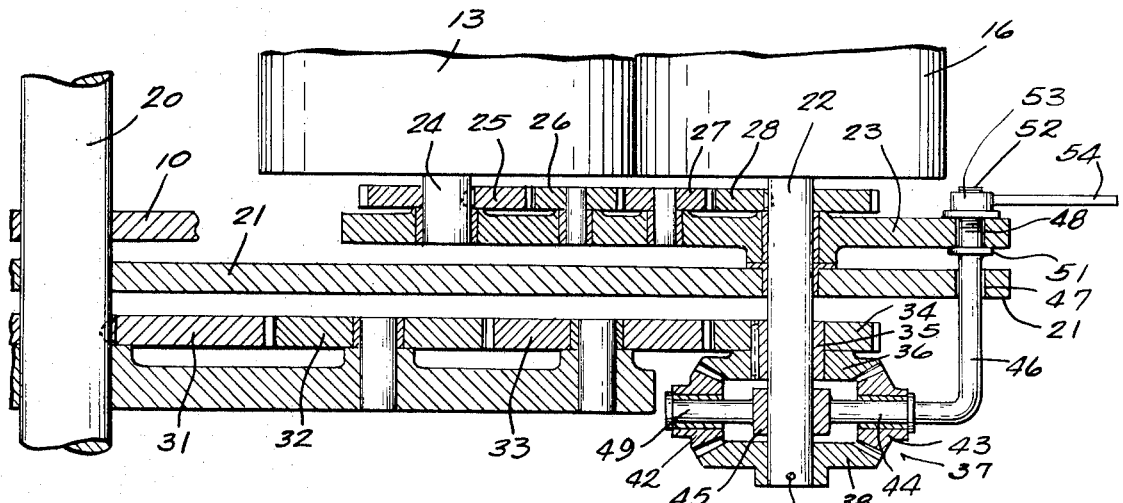
FIG. 2 is a composite section taken along the lines X—X and Y—Y of FIG. 1.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Turntable conveyor 10 rotates in the direction of arrow 11 and conveys a series of containers 12 past a labeling turret 13. The labeling turret is shown diagrammatically in the drawings and is provided with a series of label applying or transfer pads 14 of the type shown in my copending United States patent application Ser. No. 663,289 filed Aug. 25, 1967.

Labels from magazine 15 are transferred to the pads 14 on the turret 13 by a label transfer rotor 16 which is shown only diagrammatically in the instant drawings, but which may have the construction shown in copending United States patent application Ser. No. 745,778 filed July 18, 1968.

The turntable conveyor 10 is rotated by its shaft 20 which is mounted in frame 21 which also provides a support for the shaft 22 of the transfer rotor 16. Rotatable about the axis of shaft 22 is a swing plate 23 which provides a bearing for the shaft 24 of the labeling turret 13 and also provides bearings for a series of drive gears 25, 26, 27 and 28 which transmit the rotation of the shaft 22 to shaft 24. Accordingly, the labeling rotor 16 and labeling turret 13 are rotated in unison.

Shaft 22 is driven from shaft 20 by a series of intermeshing gears 31, 32, 33 and 34. Gear 34 is free to rotate on bearing 35 on shaft 22, but has keyed to its undersurface a side gear 36 of a differential 37 which includes an axially spaced second side gear 38. Side gear 38 is fast to shaft 22 by reason of a pin 41 or the like.

The side gears 36, 38 of the differential 37 are spanned by pinions 42, 43 which are mounted for rotation about coaxial stub axles 44, 49 which have their inboard ends in bearing engagement with a central collar 45 which is free to turn with respect to the shaft 22.

Axle 44 is extended in the form of a crank arm 46 which extends upwardly through an arcuate slot 47 cut into the frame 21 and also through an arcuate slot 48 cut into the swing plate 23.

Crank arm 46 has a shoulder 51 beneath swing plate 23. The upper end of the crank arm 46 is threaded at 52 to receive a nut 53 which may be tightened or loosened by a handle 54. When the nut 53 is loosened the crank arm 46 may be swung to the extent permitted by the slots 47, 48 to cause the pinions 42, 43 of differential 37 to walk on the gear 36 and turn gear 38 with respect to gear 36 about the axis of shaft 22. This in turn causes rotation of the shaft 22 and the gears 25, 26, 27, 28 connected thereto, thus to rotate shaft 24, even though gears 31, 32, 33, 34 do not turn.

Assume that a series of small diameter containers 12, shown in full lines in FIG. 1, are being labeled. The labeling turret 13 is then disposed in its full line position, shown in FIG. 1, with the center of the respective pads 14 aligned on the radius of the turntable 10 through the center of the container 12, thus to effectuate proper transfer of labels from the turret 13 to the containers 12.

If a series of somewhat larger containers 55 are to be processed on the machine, these being shown in dotted lines in FIG. 1, the first step is to swing the plate 23 about the axis of shaft 22 and through angle A from its full line position to its dotted line position shown in FIG. 1. This will shift the labeling turret 13 radially outwardly so as to leave room for the larger diameter containers 55 to be conveyed past the turret. However, in the course of this swinging movement and inasmuch as shaft 22 with its gear 28 would ordinarily be held fixed by the gear train 31, 32, 33, 34, the swinging movement of the plate 23 through the angle A will result in a corresponding rotation of the labeling turret 13 through the angle B, as shown in FIG. 1. In this new turret position the center of the pads 14 will no longer be disposed on the radius of the turntable 10 when the container 55 is directly opposite the pad 14.

In accordance with the invention, however, the labeling turret 13 is now counter-rotated back to its dotted line position 57 of FIG. 1 by manipulating the crank arm 46 to actuate the differential 37. This will cause rotation of shaft 22 which will in turn rotate the gears of gear train 25–28 and thus counter-rotate shaft 24 until the turret 13 has rotated back to its dotted line position 57. In his position the centerline of the pads 14 is again disposed on the radius of the turntable 10 through the center of the container 55 for proper registration of the pads with the container.

To effectuate actuation of the differential 37, nut 53 may first be loosened so as to free up the crank arm 46 for manual manipulation. The crank arm is swung through a sufficient arc so that the operator can judge by sight when re-registeration has been established between the labeling turret and the containers. Graduation marks 58 may also be provided adjacent the slot 48 and calibrated in accordance with container size to assist the operator in making this adjustment.

Aternatively, the nut 53 may be left tight, whereupon swinging movement o fthe plate 23 through angle A will automatically result in differential action to counter-rotate the labeling turret 13 through angle B, or nearly so, depending upon the specific sizes of the parts.

When a series of small sized containers 12, or a series of intermediate sized containers are again processed, the plate 23 will be swung inwardly and the handle 46 manipulated in the opposite direction to re-register the turret.

In the foregoing manner, the differential functions as a means to rotate the labeling turret 13 on its own axis and independently of the engagement of the various gears of the drive train, and thus selectively advance and retard the timed relation between the conveyor and the turret. Accordingly, there is no need for substituting a different size turret 13 or replacing the pads 14 with different sized pads in order to adapt the machine for handling containers of different diameters. The mecahnism of the present invention permits the same turret and pads to be used, regardless of the sizes of the containers, and this eliminates the extra parts which might otherwise be required and also eliminates the time required to make parts substitutions.

I claim:

1. In a container labeling machine having a container carrying conveyor, a rotary labeling turret adjacent said conveyor, a power drive train between the conveyor and turret to drive the turret in time with containers on the conveyor, and a support for the turret on which the turret will rotate about its own axis when it is moved on its support toward or away from the conveyor, the improvement to avoid mis-registration of the turret with containers on the conveyor as a consequence of such movement and comprising means to rotate the turret on its own axis independently of its drive train to selectively advance and retard the timed relation between the conveyor and the turret.

2. The machine of claim 1 in which said power drive train comprises a gear set, said means comprising a differential in said gear set.

3. The machine of claim 2 in which said differential comprises side gears and differential pinions spanning between said side gears, said pinions having an axle with a handle by which the pinions are selectively rotated about the axis of the side gears.

4. The machine of claim 1 in which said power drive train comprises a gear train, said support comprising a shaft coaxial with one gear in said gear train, and a swing plate swingable about said shaft, said turret being mounted on said plate for swinging movement therewith.

5. The machine of claim 4 in which said one gear comprises a side gear in said differential, another side gear spaced therefrom, pinions spanning between said side gears, said pinions having an axle by which the pinions are selectively rotatable about the axis of the side gears, and a handle for said axle.

6. The machine of claim 5 in which said handle extends through a slot in said swing plate, and means to releasably fasten said handle to said plate.

References Cited

UNITED STATES PATENTS

| | | | |
|---|---|---|---|
| 2,234,674 | 3/1941 | Jacobson | 74—395 |
| 2,946,231 | 7/1960 | Hornbostel | 74—395 |
| 3,364,789 | 1/1968 | Whitfield | 74—675 |
| 3,385,125 | 5/1968 | Plumb | 74—395 |

LEONARD H. GERIN, Primary Examiner

U.S. Cl. X.R.

156—567